United States Patent [19]

Tickle et al.

[11] Patent Number: 4,807,726
[45] Date of Patent: Feb. 28, 1989

[54] PAD RETAINING PLATE ASSEMBLIES FOR USE IN BRAKE SHOE ASSEMBLIES

[75] Inventors: Colin J. F. Tickle, Burton; Robert L. D. Burns, Dubai, both of Great Britain

[73] Assignee: Lucas Industries public limited company, Birmingham, England

[21] Appl. No.: 118,914

[22] Filed: Nov. 10, 1987

[30] Foreign Application Priority Data

Nov. 11, 1986 [GB] United Kingdom ................ 8626922

[51] Int. Cl.[4] ...................... F16D 55/00; F16D 65/04; F16D 13/00
[52] U.S. Cl. .................................. 188/73.32; 188/244; 192/70.13
[58] Field of Search ................. 188/73.1, 73.32, 73.33, 188/73.37, 73.38, 370, 250 G, 234, 244; 192/70.13; 403/327, 327, 330

[56] References Cited

U.S. PATENT DOCUMENTS 4,296,841 10/1981 Fujimori et al. ................ 188/73.1 X
4,371,061 2/1983 Ottewell ...................... 188/73.32 X
4,682,905 7/1987 Riding et al. ................. 188/73.1 X,

FOREIGN PATENT DOCUMENTS 0905797 9/1962 United Kingdom ............. 188/73.32

Primary Examiner—Andres Kashnikow
Assistant Examiner—Robert J. Oberleitner
Attorney, Agent, or Firm—Scrivener and Clarke

[57] ABSTRACT

The present invention provides a pad retaining plate assembly which can be operated to allow for pad replacement without any part having to be removed and without the inconvenience of having to deal with nuts, bolts, etc. The pad retaining plate assembly comprises a latch member which is movable relative to a guide, the guide being secured to a brake shoe so that the latch member can then attain an operative position wherein the latch member projects through an aperture in the brake shoe. A spring also mounted on the brake shoe is arranged to grip the latch member and to hold the latch member in the said operative position when this position is attained. The latch member can be moved away by a simple tool against the grip of the spring to facilitate pad replacement.

9 Claims, 3 Drawing Sheets

PAD RETAINING PLATE ASSEMBLIES FOR USE IN BRAKE SHOE ASSEMBLIES

The present invention relates to a pad retaining latch assembly for use in retaining a brake pad on a brake shoe.

With certain brake shoes for use on railway vehicles, the brake pad of friction material is formed with a dovetail formation on its rear surface so that the pad can be slid into a complementarily shaped recess provided in a face of the brake shoe, the recess being closed at one end and open at the other end to allow for the insertion of one or more brake pads. To retain a brake pad in said recess, a pad retaining assembly is usually provided. The pad retaining assembly typically comprises a latch member which obstructs the open end of the recess to prevent removal of the brake pad. The latch member may form an end cover to the brake shoe or project through an aperture adjacent to the end of the shoe. Such latch members may be held in the operative position by, for example, screws, split pins, cotters etc. which exhibit varying degrees of difficulty in being released and re-engaged. To replace a defective or worn brake pad in one known example of such an arrangement, as described in British Patent Specification No.1533857, the assembly is simply loosened by being unbolted from the shoe so that the latch member can be moved. Whilst this appears a simple operation it is to be appreciated that the brake shoes are usually in relatively inaccessible positions under, for example, railway vehicles, so that it can be a difficult and lengthy operation to remove and replace brake pads.

The aim of the present invention is to provide a pad retaining plate assembly which can be operated to allow for pad replacement without any part having to be itself removed and without the inconvenience of having to deal with nuts, screws, cotters etc.

According to the present invention there is provided a pad retaining plate assembly comprising a latch member arranged to be moved relative to a guide, the guide being adapted to be secured to a brake shoe so that the latch member then projects through an aperture in the brake shoe, and spring means arranged to retain the latch member in an operative position.

In one preferred embodiment of the present invention the latch member is generally rectangular with a planar forward or operative (front) edge and a reduced dimension elongate projection extending from the rear edge, the elongate projection extending through a substantially complementary slot in the guide. The guide itself is generally U-shaped and serves as a form of cage to protect the latch member and spring when installed, the base region of the U-shaped cage being extended laterally to, on one side, provide further projection for the latch member and spring, and on the other side to provide a tongue which can be bolted to the brake shoe. The spring is preferably a leaf spring of similar shape to the guide or cage, with the arms of the U-shaped spring having inwardly deformed regions which form detents facing each other, these detents gripping the side edges of the generally rectangular latch member and locating in grooves in said side edges when the latch member has been moved to said operative position. Thus the spring can retain the latch member in said operative position.

In use the latch member may be moved by simply inserting an elongate tool, e.g. a screwdriver, into a hole or recess in the latch member and moving the tool by applying leverage against part of the brake shoe. Forward movement of the latch member may be limited by roll pins fitted snugly in bores in a face of the generally rectangular latch member, the roll pins projecting from the latch member so that they can engage the brake shoe to restrict the forward movement of the latch member and positively retain the latch member in the assembly Alternatively or additionally the sides of the latch member may be provided with tapered laterally projecting regions, these regions tapering towards the forward operative end region of the latch member. Thus the tapered laterally projecting regions will engage, preferably complementary, tapered surfaces at the ends of the preferably elongate, generally rectangular aperture in the brake shoe, to positively retain the latch member in the assembly. Preferably the generally rectangular aperture has curved end regions, point contact only being possible between the corners at each side of the latch member and the curved end regions, so that the aperture guides movement of the latch member with the minimum of frictional resistance. The above constructional features may also be designed to limit the movement of the latch member in the forward operative direction, so that undesirable contact between the latch member and the surface of the brake disc, is avoided.

In an alternative embodiment of the present invention the spring is generally L-shaped and acts on one or other of the planar faces of the rectangular latch member, to bias the latch member into engagement with one of the side faces of the aperture in the brake shoe. The L-shaped spring is plate-like and has a detent feature which can engage in an transverse groove provided in a planar face of the latch member, to thus hold the latch member in the forward operative position. Other grooves can be provided on the planar face of the latch member to enable the spring to retain the latch member in any of a number of possible positions.

The present invention will now be further described, by way of example, with reference to the accompanying drawings, in which.

Figure 1:
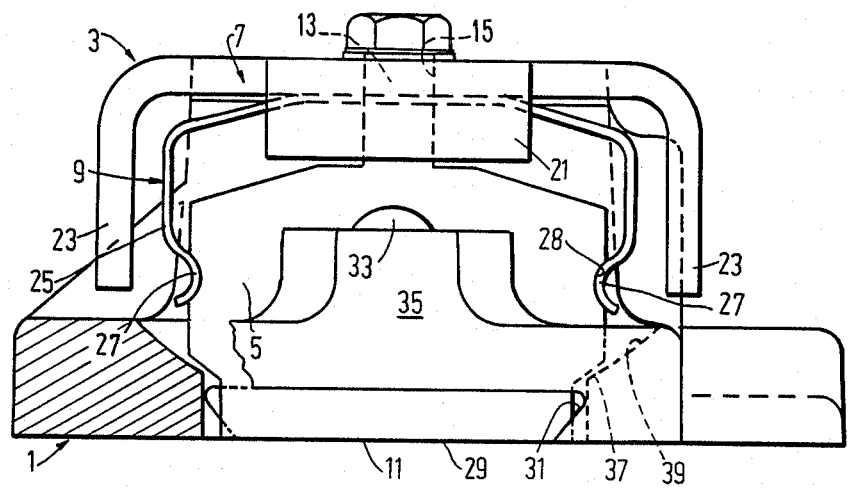
FIG. 1 is an end elevation of a brake shoe incorporating a preferred embodiment of the present invention.

The brake shoe (1) illustrated in the accompanying drawings incorporates a preferred embodiment of a pad retaining assembly, generally designated (3), constructed according to the present invention. The pad retaining assembly (3) comprises a generally rectangular plate-like latch member (5), a generally U-shaped guide (7) for the latch member (5), and a generally U-shaped leaf spring (9).

The latch member (5) has a planar forward or operative edge (11) and a reduced dimension elongate projection (13) extending from the rearward region of the latch member (5). The elongate projection (13) extends through a substantially complementary slot (15) formed in both the guide (7) and the spring (9), the guide (7) being located over the spring (9). Both the guide (7) and the spring (9) have a laterally projecting planar section (17,19) which sections are engaged against each other and bolted directly to the brake shoe (1). Thus the guide (7) and spring (9) are secured to the brake shoe (1). The guide (7) also has an oppositely directed lateral projection (21) which is bent substantially parallel to arms (23) of the U-shaped guide 7), projection 21) and arms (23 forming a type of cage to protect the latch member (5) and spring (9).

The generally U-shaped spring (9) has generally parallel arms (25), each of which has inwardly directed detent features (27 , these detents or lobes facing each other and gripping opposite sides of the latch member (5). The latch member (5) can be moved such that the elongate projection (13) moves through the slot (15), the lobes (27) sliding over the sides of the latch member (5). In one operative position of the latch member (5) the lobes (27) engage in corresponding recesses (2.8) on the sides of the latch member (5) to hold the latch member in said operative position. The spring (9) and latch member (5) are dimensioned so as to prevent the vibrations associated with and resulting from vehicle movement causing the latch member (5) to move out of engagement with said spring lobes (27). In this operative position the forward or operative edge region (11) of the latch member (5) projects through an aperture (29) in the brake shoe (1) to close off at least partially, an open end of a dovetail recess (31) in the brake shoe, in which a partially complementarily shaped brake pad (not shown) can be engaged. In an alternative embodiment (not illustrated) other recesses are formed in the latch member (5) to positively engage with the spring detent features (27) when the latch member (5) is in the withdrawn non-operative position. To move the latch member (5) to the withdrawn non-operative position an elongate tool, e.g. a screwdriver, can be simply engaged in a hole (33) in the latch member (5) and leverage applied against the brake shoe (1), for example against boss (35), to overcome the grip of the spring (9). The latch member (5) can be returned to the opposite position by applying leverage against the guide projection (21).

The latch member (5) is prevented from excessive movement in the forward operative direction by tapered regions (37) provided on the said sides of the latch member (5). In the said operative position, these tapered regions (37) sit on complementary surfaces 39) of the brake shoe (1) adjacent to the ends of the aperture (29), thus preventing any further forward movement of the latch member. Alternatively roll pins (not shown) can be snugly fitted in bores in the latch member (5) to extend laterally of the latch member (5), the roll pins preventing the latch member from falling through the aperture (29) from said operative position.

Figure 3:
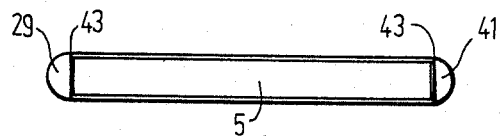
FIG. 3 is a schematic illustration showing the location of the latch member in the aperture in the brake shoe.

As best seen in FIG. 3 of the accompanying drawings, the end regions (41) of the aperture (29) are curved so that the corners (43) of the forward end regions (11) of the latch member solely engage these end regions (41), the latch member (5) thus being guided by point or rather line contact, i.e. with a minimum of frictional resistance.

Figure 2:
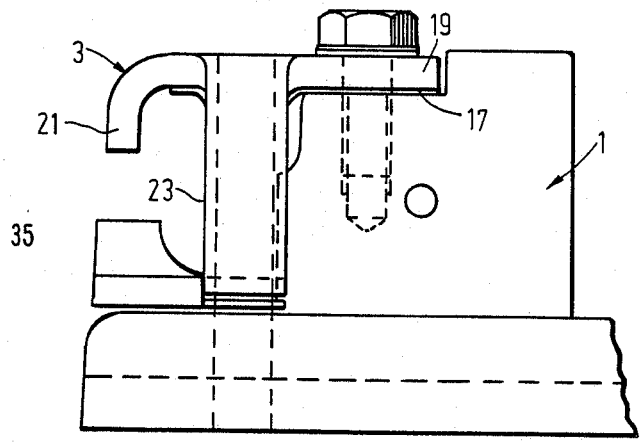
FIG. 2 is a side view of part of the brake shoe of FIG. 1 illustrating the pad retaining assembly of FIG. 1.
Figure 4:
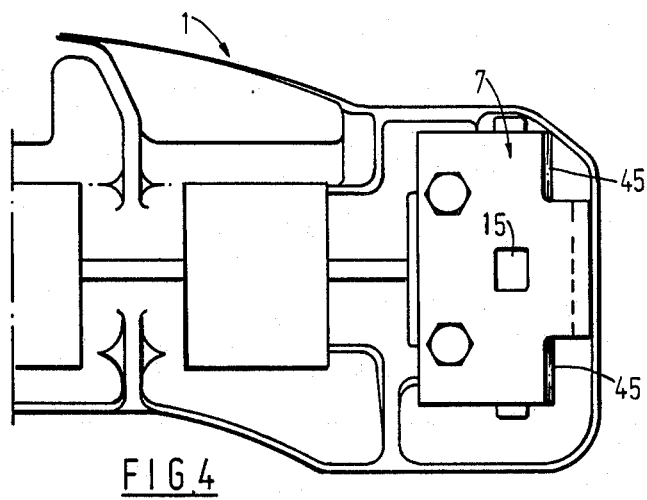
FIG. 4 is a plan view of part of a brake shoe incorporating a further embodiment of the present invention.
Figure 5:
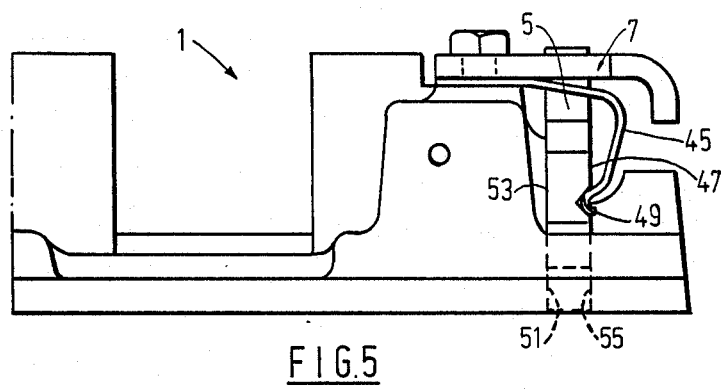
FIG. 5 is a side view of part of the brake shoe of FIG. 4.
Figure 6:
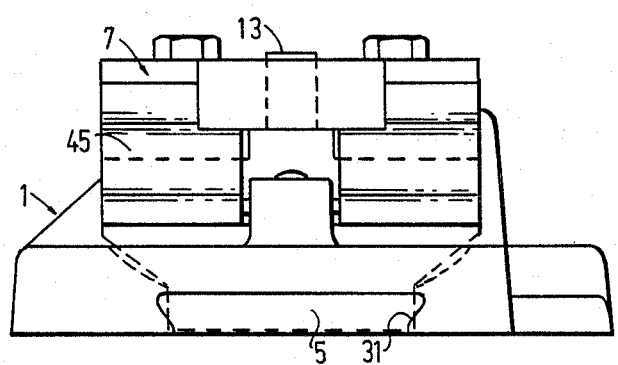
FIG. 6 is an end view of the brake shoe of FIGS. 4 and 5.

An alternative embodiment of the present invention is illustrated in FIGS. 4, 5 and 6 of the accompanying drawings, and the same reference numerals as used in FIGS. 1 to 3 are used to identify equivalent parts. The main difference between the embodiment of FIGS. 4 to 6 and the embodiment of FIGS. 1 to 3, lies in the spring (45) which is L-shaped and arranged to engage a face (47) of the latch member (5) as opposed to the two side edge regions. The spring (45) is secured with the guide (7) to the brake shoe (1), and has a detent feature (46) which can engage in a groove (49) provided in the face (47) of the latch member (5) when the latch member is in the operative forward position; the groove (49) extending transversely across the face (47). By virtue of the increased lateral dimensions of the spring (45) and the groove (49) as compared to the dimensions of the spring (9) and associated side edge grooves on the embodiment of FIGS. 1 to 3, the spring (45) more securely grips and retains the latch member (5), biassing the latch member (5) against one side face (51) of the aperture (29).

Figure 7:
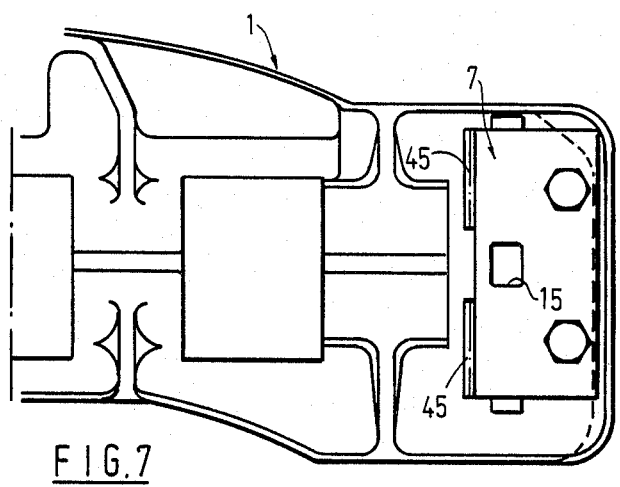
FIG. 7 is a plan view of part of a further brake shoe incorporating a still further embodiment of the present invention.
Figure 8:
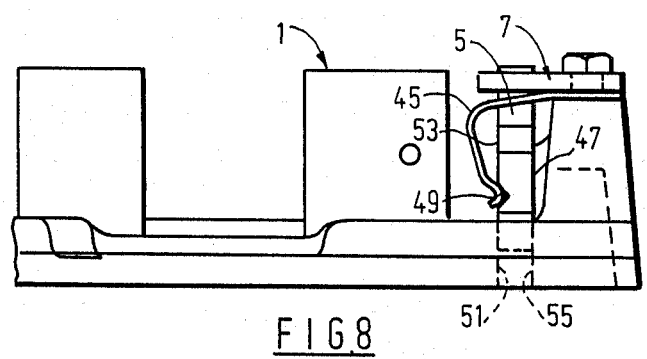
FIG. 8 is a side view of part of the brake shoe of FIG. 7.
Figure 9:
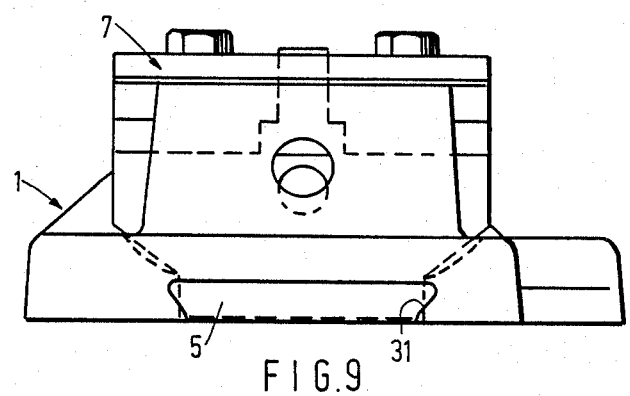
FIG. 9 is an end view of the brake shoe of FIGS. 7 and 8.

In the latter embodiment of FIGS. 4, 5 and 6, the spring (45) is arranged to bias the latch member (5) against the side face (51) of the aperture (29) adjacent to the brake pad (S) retained in the dovetail recess (31) on the brake shoe i.e. remote from the open end of the dovetail recess (31). Thus when the brake is applied, pad drag forces can press the pads against the latch member (5 , flexing the spring (45). Continuous flexing of the spring (45) can affect the performance of the spring (45). To counter this possible problem the modified arrangement of FIGS. 7, 8 and 9 has been devised wherein the L-shaped spring (45) is arranged to act on the opposite side face (53) of the latch member to thus bias the latch member (5) against the side (55) of the aperture (29) adjacent to the open end of the dovetail recess (31). Pad drag forces thus have no affect on the spring (45) in this latter modified embodiment.

The present invention thus provides a simple pad retaining assembly which can be simply operated to allow for lining replacement. Further, the guide type cage facilitates general cleaning to remove accumulated dirt, purely by the insertion and movement of an elongate tool in the pad retaining assembly.

We claim:

1. A pad retaining plate assembly comprising a latch member arranged to be movable relative to a guide, the guide being adapted to be secured to a brake shoe so that the latch member can then attain an operative position wherein the latch member projects through an aperture on the brake shoe, spring means being arranged to retain the latch member in the operative position, said spring means being a generally U-shaped leaf spring with the arms of the U-shaped spring having inwardly deformed regions which grip side edges of the latch member.

2. An assembly according to claim 1, wherein the latch member is a generally rectangular plate-like member, with a planar forward edge and a reduced dimension elongate projection extending from the rear edge, the elongate projection extending through a slot on the guide.

3. An assembly according to claim 1, wherein the guide is generally U-shaped and serves as a cage to protect the latch member and spring means when mounted on a brake shoe, the U-shaped cage having a base region which has a lateral extension on one side, to provide further protection for the latch member and spring means, and a further lateral projection on the opposite side of said base region to provide a tongue which can be bolted to the brake shoe.

4. An assembly according to claim 1, wherein the U-shaped spring has a base region having a lateral extension defining a tongue which can be bolted to the brake shoe.

5. An assembly according to claim 1, wherein grooves are provided in said side edges of the latch member, said inwardly deformed regions of the spring locating in said grooves when the latch member is in the said operative position.

6. An assembly according to claim 1 including a brake shoe, wherein the assembly is mounted on said brake shoe, the guide and spring being bolted to the brake shoe, the latch member being a generally rectangular plate-like member with a forward end projecting through the aperture in the brake shoe, the sides of the said forward end of the latch ember being tapered so that the latch member can engage with the brake shoe to limit the available forward motion of the latch member through said aperture.

7. An assembly according to claim 6, wherein complementary tapered surfaces are provided on the brake shoe for engagement by the tapered surfaces of the latch member.

8. A pad retaining plate assembly comprising a latch member arranged to be movable relative to a guide, the guide being adapted to be secured to a brake shoe so that the latch member can then attain an operative position wherein the latch member projects through an aperture on the brake shoe, spring means being arranged to retain the latch member in the operative position, said latch member being a generally rectangular, plate-like member, said spring means being a generally L-shaped spring, one arm of which acts on one of the planar faces of the latch member to bias the latch member, when installed on a brake shoe, against a side face of said aperture on the brake shoe, the other arm being adapted to be secured to the brake shoe.

9. An assembly according to claim 8, wherein said one arm of the L-shaped spring has a detent which can engage in a transverse groove provided on a planar face of the latch member to thus hold the latch member in said operative position.

* * * * *